June 5, 1928.

R. C. SCOTT

EXPANSION JOINT

Filed June 1, 1925

1,672,693

INVENTOR:
Robert C. Scott
BY Henry T. Williams
ATTORNEY

Patented June 5, 1928.

1,672,693

UNITED STATES PATENT OFFICE.

ROBERT C. SCOTT, OF CAMBRIDGE, MASSACHUSETTS.

EXPANSION JOINT.

Application filed June 1, 1925. Serial No. 33,939.

The invention to be hereinafter described relates to expansion joints for electric conductors, and more particularly to expansion joints for buses employed in high voltage power or switching stations for the transmission of electrical energy.

Two types of construction are in common use, one in which the bus is suspended, and the other in which the bus is rigid. The latter is usually considered the mechanically stronger type of construction. However, heretofore the rigid type of bus construction has been found objectionable, since stresses and strains are imposed on the porcelain or other insulation parts used in the bus supports and bushings. Porcelain is fairly strong in compression, but relatively weak in resisting shear stresses. The consequence is that after installation and putting of the bus into service, the porcelain parts are liable to become broken and result in disaster. The stresses on the bus supports are from a number of causes. Among these are motion of the structure due to wind, settling of structure foundations or columns, expansion and contraction due to temperature changes, and motion of floor slabs or the apparatus itself during the opening and closing of circuit breakers.

The purpose of the present invention, therefore, is to provide a strong, simple, efficient expansion joint which will automatically compensate for stresses which may be imposed on porcelain or other parts of bus supports.

Figure 1:
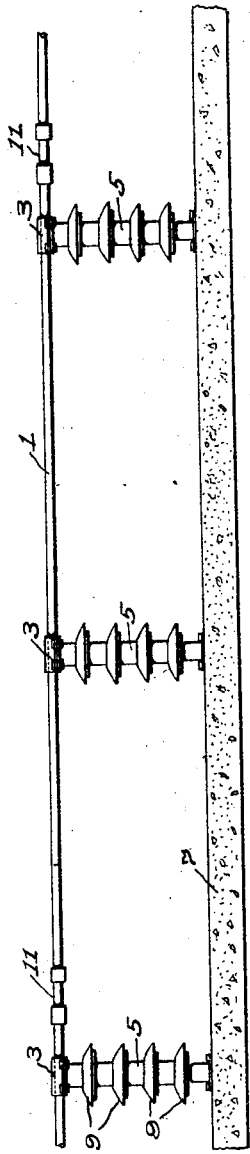
Figure 2:
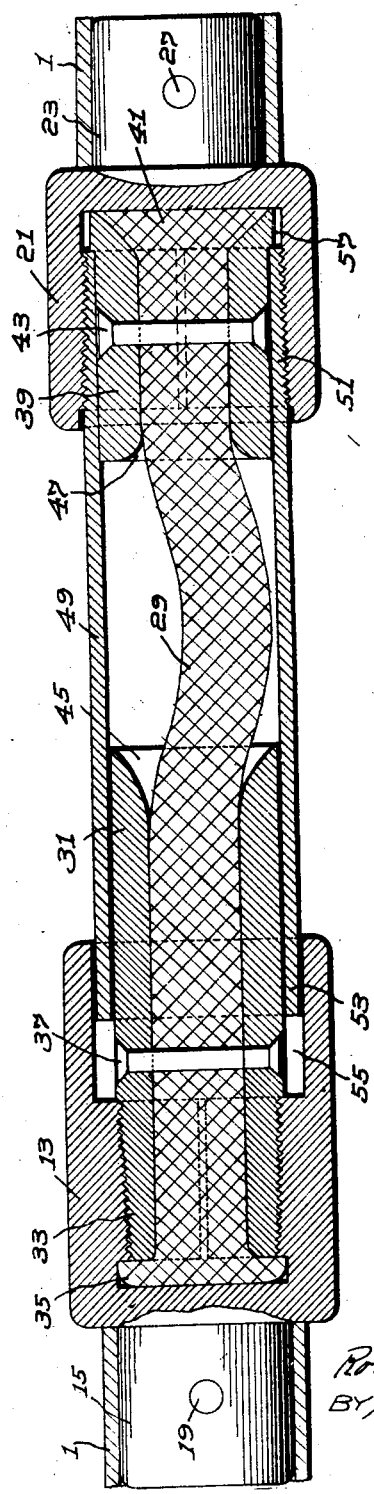

The character of the invention may be best understood by reference to the following description of one good form thereof shown in the accompanying drawing, wherein:

Fig. 1 is an elevation of a bus run rigidly secured at intervals to post type insulators mounted on a floor slab, said bus run being provided at intervals with expansion joints embodying the invention; and Fig. 2 on an enlarged scale is a longitudinal section through one of the expansion joints shown in Fig. 1.

Referring to the drawing, 1 designates a copper tubular bus rigidly fastened by clamps 3 to posts 5 which are mounted on and bolted to a floor slab 7 at suitable intervals. Each of the posts is provided with a series of porcelain insulators 9.

Expansion joints 11 are interposed in the bus at appropriate intervals, two of these joints being shown herein, but it will be understood that the number thereof may be varied as required.

Each of these expansion joints comprises a socket or member 13 having a stud 15 adapted to enter an end portion of the tubular bus and be secured thereto by a rivet 19. A socket or member 21 has a stud 23 adapted to enter an end portion of the tubular bus and be secured thereto by a rivet 27.

A flexible conductor element, in the present instance, in the form of a pigtail 29 made of plaited fine copper wire, extends between and is secured to the sockets. In the present instance, an end portion of the pigtail extends through a sleeve 31 having a tapered portion 33 threaded to a tapered portion of the socket 13 and slotted to permit said tapered portion 33 to contract slightly as it is screwed into the tapered portion of the socket, thereby to prevent the sleeve from unscrewing from the socket. An end of the pigtail may be upset to form a head 35 adapted to be confined between the inner end of the sleeve 31 and the base of the socket. The pigtail may be positively secured to the sleeve 31 by a rivet 37. The opposite end portion of the pigtail extends through a sleeve 39, and the end thereof is upset to form a head 41 adapted to be confined between the inner end of the sleeve 39 and the base of the socket 21. The pigtail may be positively secured to the sleeve 39 by a rivet 43. The sleeve 31 may have a flared mouth 45, and the sleeve 39 may have a flared mouth 47 to facilitate flexion of the pigtail and prevent injury thereto on flexion thereof.

A tube or housing 49 has an end portion 51 tapered and threaded to the socket 21, and an end portion 53 entered into a counterbore 55 in the socket 13, the construction being such that the tube and the socket are in telescopic relation. The end portion 51 of the tube 49 receives the sleeve 39 and engages a flange 57 on the inner end of said sleeve, the construction being such that when the tube 49 is screwed into the socket 21, the inner end of the tube will engage the flange 57 and hold the latter against the base of the socket. The end portion 51 of the tube is slotted to permit it to contract slightly as it is screwed into the socket, thereby to prevent the tube from unscrewing from the socket. The opposite ends of the pigtail are pressed against and have good conducting contact with the bases of the sockets.

The ends of the sockets are rounded, and the ends of the studs which project from the sockets are rounded, thereby to prevent corona losses.

The construction is such that when motion of the bus supports occurs from any cause, such, for example, as from the conditions above mentioned, the sockets may move toward or from each other, and the pigtail may bend or straighten within the ample space provided in the tube 49, and thereby compensate for such motion and prevent setting up stresses in the supports which might cause breakage of the porcelain insulators.

The relation of the tube to the sockets is such that they are maintained in axial alinement and prevent sagging of the bus at the joint.

The relative cross sectional area of the copper in the pigtail and in the tubular bus should be such that the electrical resistance of the pigtail shall not be greater than the bus. Otherwise the pigtail might be heated to a greater degree than the bus and result in melting of the fine copper wires of the pigtail. The current passes from one of the bus end portions through the socket stud and the bases of the socket thereat, and thence directly through the pigtail to the base and stud of the other socket, and on through the tubular end portion of the bus thereat. Thus, the main current passes through the pigtail and practically none of it passes through the tube 49. It will be observed that the pigtail is so formed that it does not have a loop which might produce a choke coil effect. The telescopic construction of the expansion joint and the ease of flexion of the pigtail enable ready expansion and contraction, the pigtail is enclosed within and protected by the tube and sockets, and the latter may be in alinement with the bus and not of a diameter substantially greater than that of the bus. The joint is mechanically strong in construction and of pleasing design. Its electrical resistance is lower than an equal length of the bus in which it is interposed, while its current carrying capacity is greater than the cross section of the bus. The joint introduces no corona or magnetic losses and has no inductive characteristics. It is positively and rigidly connected to end portions of the bus, and has no soldered or weak parts. It is evident that an expansion joint such as described herein adequately provides for the prevention of breakage of porcelain parts used in bus supporting construction, and thus tends to eliminate delays and damage heretofore caused by shutdowns due to breakage of insulators or bushings.

The parts of the expansion joint desirably may be made of copper, but it will be understood that said parts may be formed of any other suitable conductor of electricity.

While the expansion joint has been described herein in respect to its use in a bus secured to post type insulators mounted on a floor slab, it will be understood that it may be employed in busses for oil circuit breakers, buses for transformers, and in other installations.

It will be understood that the invention is not limited to the specific embodiment shown, and that various deviations may be made therefrom without departing from the spirit and scope of the appended claim.

What is claimed is:—

An expansion joint for a rigid bus suspended between and supported on spaced insulators, comprising a pair of rigid members adapted for connection with adjacent ends of the bus, a conductor having end portions secured to said members and a flexible portion extending between said members, and a single rigid external tube extending between said members and enclosing the flexible conductor, said tube being slidable relatively to at least one of the members on longitudinal movement of the bus, all of said parts being uninsulated conductors, and said tube and members being arranged to prevent relative movement thereof transversely to their length.

ROBERT C. SCOTT.